United States Patent
Swanson

[11] Patent Number: 6,006,978
[45] Date of Patent: Dec. 28, 1999

[54] PRESSURE HEAD WITH PIVOT ROD GIMBAL HORN WITH ZERO ADJUST

[76] Inventor: David W. Swanson, 2750 Felicita Rd., Escondido, Calif. 92029

[21] Appl. No.: 08/806,088

[22] Filed: Feb. 25, 1997

[51] Int. Cl.[6] .................................................. B23K 20/00
[52] U.S. Cl. ...................... 228/44.7; 228/44.3; 228/4.1; 228/102; 228/212
[58] Field of Search ................... 228/44.7, 4.1, 228/212, 102, 180.21, 44.3

[56] References Cited

U.S. PATENT DOCUMENTS

3,938,722  2/1976  Kelly et al. .................................. 228/1

*Primary Examiner*—Patrick Ryan
*Assistant Examiner*—M. Alexandra Elve
*Attorney, Agent, or Firm*—Calif Tervo

[57] ABSTRACT

A pressure head (10) for contacting a workpiece (230) through relative movement in the vertical Z-direction includes a frame (20), a horn (100) for contacting the workpiece (230) and a gimbal (40) connected to the frame (20). The gimbal (40) supports the horn (100) such that the horn (100) can rotate about orthogonal X and Y rotation axes and can translate in the Z-direction relative to the frame (20). Three adjustment arms (170) movably connected to the frame (20) each apply a force on the horn (100) at points determining a plane for rotating the horn (100) about the X-axis or the Y-axis to a fixed position before contact with the workpiece (230). The adjustment arms (170) also provide electrical connection to electrical devices (136, 138) on the horn (100). A movable contact arm (190) connected to the frame (20) also contacts the horn (100) for providing an electrical connection.

20 Claims, 5 Drawing Sheets

PRESSURE HEAD WITH PIVOT ROD GIMBAL HORN WITH ZERO ADJUST

BACKGROUND OF THE INVENTION

1. Field of the Invention

This invention relates in general to a pressure head for bonding parts with heat and pressure and more specifically to a pressure head having a gimbaled horn that pivots on its push rod and having an adjustable zero-pressure position.

2. Description of the Related Art

A thrust head or head is commonly used to attach one item to another. The head must move relative to the workpiece. In some applications the workpiece is moved into contact with the head. In other applications, the head is moved by a thruster, such as a pneumatic cylinder. The horn, that is the working element of the head, may be heated for bonding work pieces together, that is one article to another with heat and pressure. For example, a ribbon cable circuit may be bonded to an electronic component or a flip chip may be bonded to the electronic package circuitry.

In many applications, but particularly when heat and pressure are to be applied in the bonding, it is imperative that the horn face, that is the pressure surface of the horn, align perfectly with the surface of the work pieces. One method of horn alignment to solve this problem has been to gimbal the horn such that, upon encountering the workpiece, the horn rotates to alignment.

In many applications with work pieces requiring very close bonding tolerances, it imperative that the force exerted on the horn by the workpiece required to align the gimbaled horn with the workpiece be extremely small. This is necessitated because the gimbaled horn not only rotates as it is aligned but also moves sideways thereby producing shear forces on the workpiece. If the rotational force is more than de minimis, then the shear force created in the rotation will disrupt the workpiece. Consequently, the mass of the gimbaled head needs to be minimized and the lever arm from the point of alignment force to the gimbal point or axis need to be maximized. Even the forces required to overcome the static friction of bearings in many conventional gimbaled horns or to overcome the moment and resistance to rotation created by wires leading to the heating element and thermocouple on the gimbaled horn are too large for use in some high tolerance applications.

Additionally, if the amount of necessary alignment rotation or average alignment rotation is known beforehand, it would be advantageous to pre-align, that is "zero", the horn beforehand as this would diminish or eliminate shear forces on the workpieces.

Therefore, there has been a need for a thrust head including apparatus for zero adjusting the gimbaled horn.

It is further desirable that the gimbaled horn is not fixed in the head in the up/down direction, such that, upon first encountering the workpiece the horn can move within the head such that much lower shear forces are generated on the workpiece.

It is further desirable that the gimbaled horn requires minimal force to align the horn face with the workpiece.

SUMMARY OF THE INVENTION

This invention is a pressure head for contacting a workpiece through relative movement in the vertical Z-direction. The head includes a frame, a horn for contacting the article and a gimbal connected to the frame. The gimbal supports the horn such that the horn can rotate about orthogonal X and Y rotation axes and can translate in the Z-direction relative to the frame.

Three adjustment arms movably connected to the frame each apply a force on the horn at points determining a plane for rotating the horn about the X-axis or the Y-axis to a fixed position before contact with the workpiece.

In a preferred embodiment, the horn includes a heater and an thermocouple and the adjustment arms also provide electrical connection to the devices. A contact arm connected to the frame has an inner end moveable in the Z-direction and biased to contact the horn for providing an electrical connection.

In a preferred embodiment, the gimbal comprises orthogonal pairs of leaf spring torsion members supported by cantilevered leaf springs such that the horn can rotate about the X and Y axes and can translate in the Z-direction but cannot translate in the X and Y directions. A downward biased pivot rod bears against the horn for applying pressure to the horn and a stop limits upward horn travel.

Other features and many attendant advantages of the invention will become more apparent upon a reading of the following detailed description together with the drawings in which like reference numerals refer to like parts throughout.

DETAILED DESCRIPTION OF THE INVENTION

For ease of description with reference to the drawings, the up/down direction is considered the Z direction; the left/right direction is the X direction and the front/back direction is the Y direction.

Figure 1:
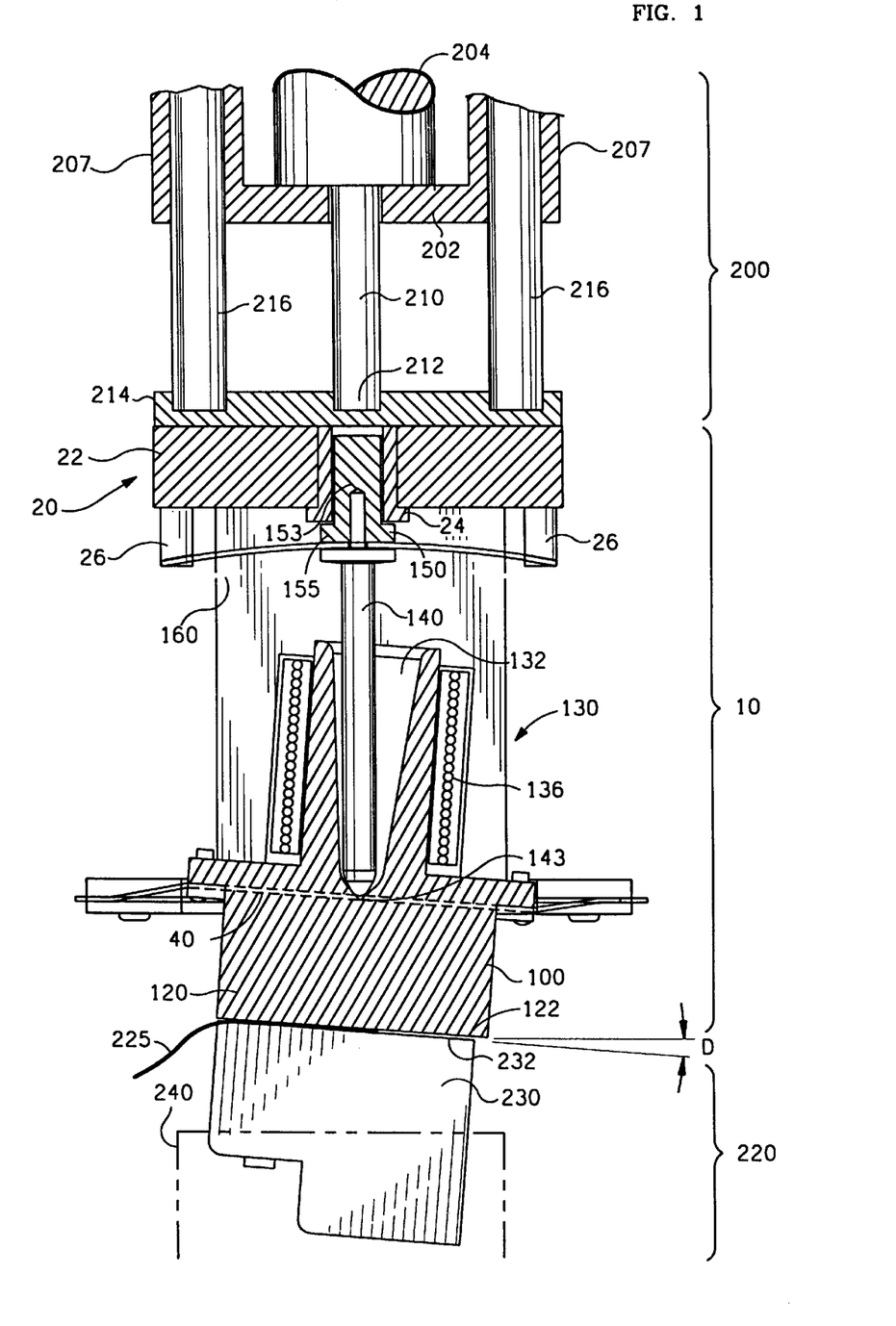
FIG. 1 is a left side view, partially in section and partially cut away, of the head of the invention shown attached to a linear thruster and bonding a ribbon circuit onto an electronic article.

With reference now the drawings, there is shown in FIG. 1 a left side view, partially in section and partially cut away, of the head, denoted in general as 10, of the invention shown attached to a linear thruster, denoted in general as 200, and bonding workpieces 220, such as a ribbon circuit 225 and an electronic article 230. Electronic article 230 is held in holding fixture 240.

Linear thruster 200 moves head 10 up and down in the Z direction to engage and disengage from workpieces 220.

Linear thruster 210 generally includes a housing 202 supporting a pneumatic cylinder 204 and guide blocks 207 containing bearings. Push rod 210 is connected to and driven up and down by a piston, not shown, in pneumatic cylinder 204. The distal end 212 of push rod 210 is connected to and moves thrust plate 214. A pair of guide rods 216, slidingly supported by bearings in guide blocks 207 and having their lower end connected to thrust plate 214, move with thrust plate 214 and retain it in the path of desired movement. Although linear thruster 210 is shown moving head 10, many other devices may be used to cycle the head/workpiece contact, including devices moving the workpieces.

By way of example as seen in FIG. 1, a ribbon circuit 225 is being bonded to the upper surface 232 of electronic part 230. Electronic part 230 is supported to holding fixture 240. The workpiece face, in this case the upper surface 232 of electronic part 230, is angled an angle D from horizontal. Upper surface 232 may also be angle in the other direction. The angling of workpiece face 232 may be the result of many factors or the combination thereof, such as imperfect placement in holding fixture 240 or tolerances in fabrication of the part 230.

As an overview, head 10 is shown in bonding position. The horn 100 of head 10 is gimbaled on gimbal 40 and has rotated such that the horn face 122 is aligned with workpiece face 232. Pivot rod 140 is applying pressure from thruster 200 to horn 100 and thus to workpieces 220.

Figure 2:
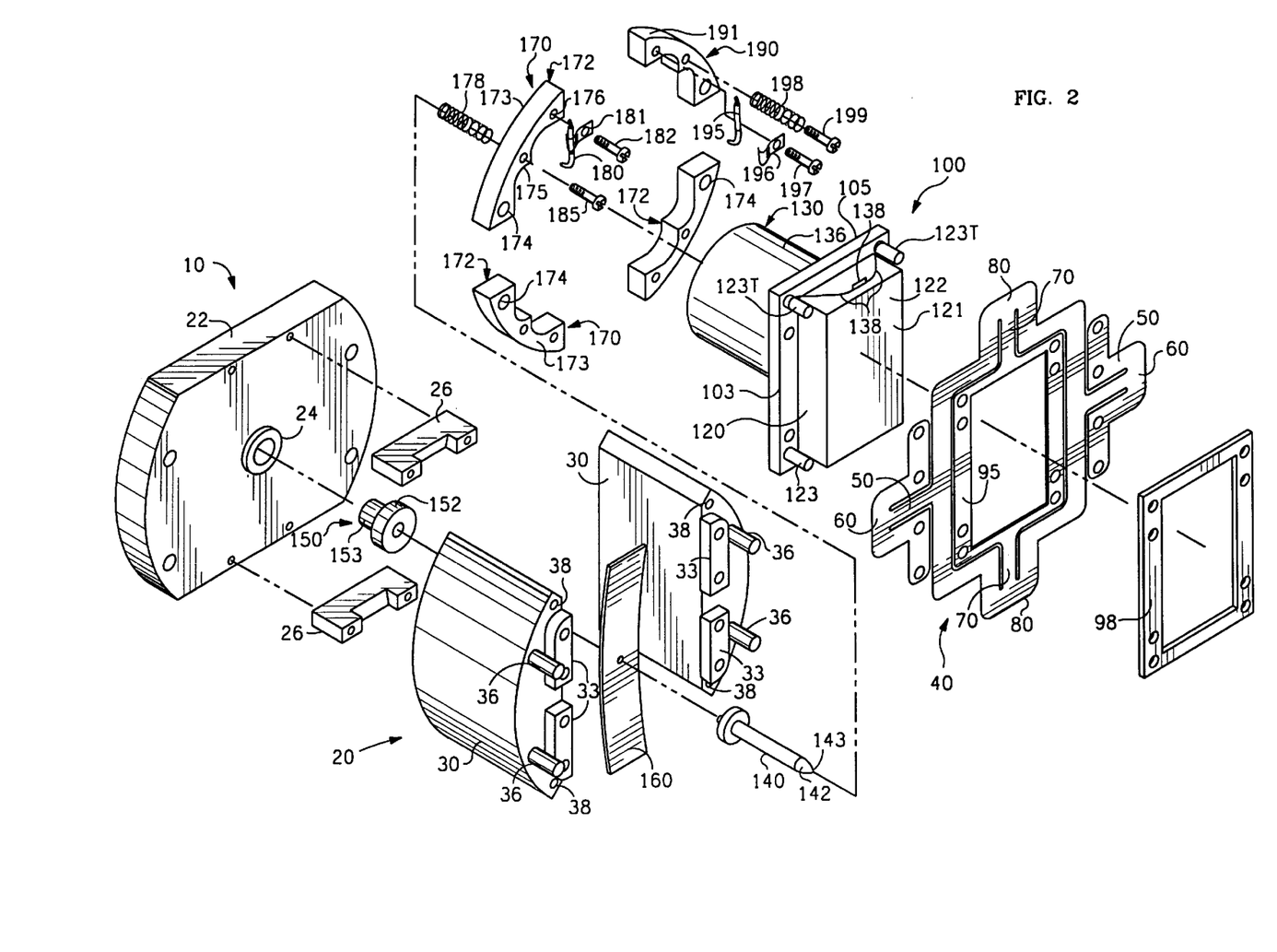
FIG. 2 is an exploded perspective view of the head of FIG. 1.
Figure 3:
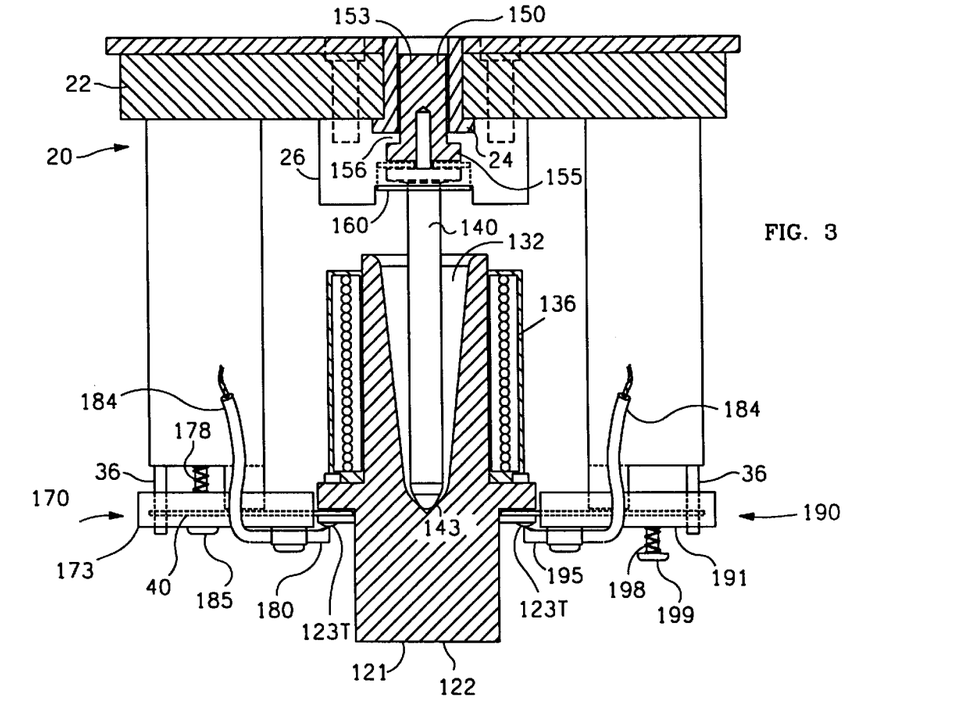
FIG. 3 is a front sectional elevation view of the head of FIG. 1 showing a zero adjust contact and a thermocouple contact.
Figure 4:
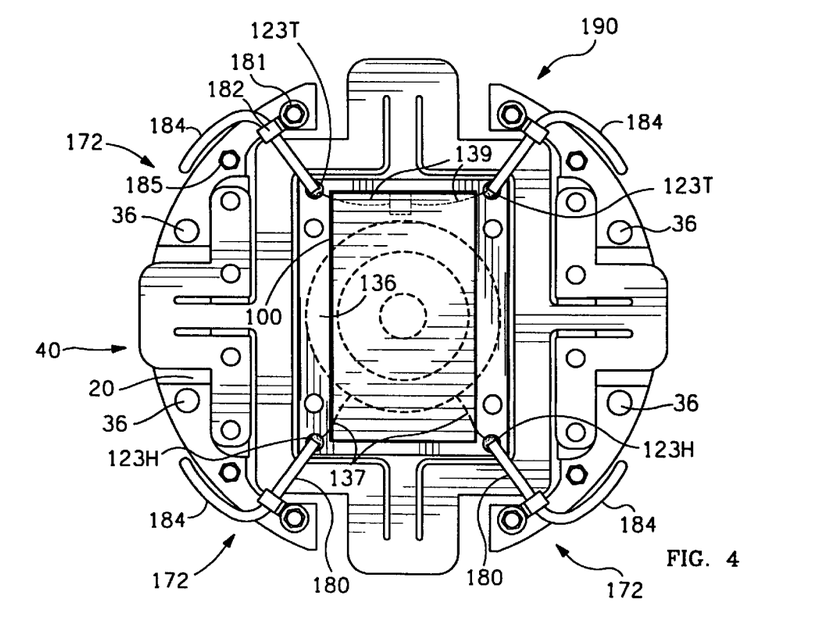
FIG. 4 is a bottom plan view of FIG. 3.

Now including FIGS. 2, 3 and 4; FIG. 2 is an exploded perspective view of head 10 of FIG. 1. FIG. 3 is a front sectional elevation view of the head of FIG. 1. FIG. 4 is a bottom plan view of FIG. 3. Head 10 generally comprises a frame 20, a gimbal 40, horn 100, pivot rod 140, horn biasing spring 160 and zero adjustment arms 170.

Figure 5:
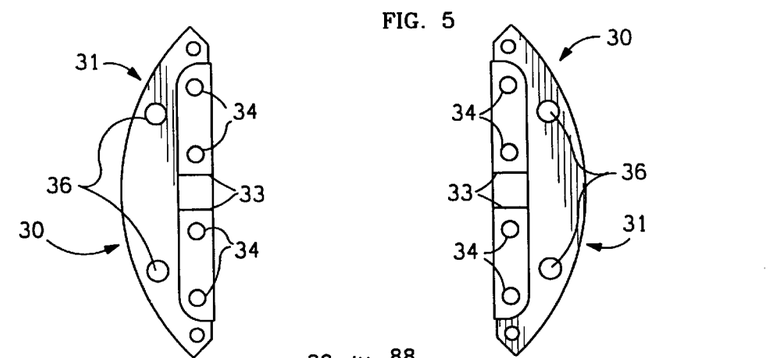
FIG. 5 is a bottom plan view of the frame sides.

Frame 20 comprises a base 22 and a pair of spring supports 26 for horn biasing spring 160 and a pair of spaced apart side walls 30 connected to base 22. The distal or lower end 31 of each side wall 30 includes a gimbal support 33. FIG. 5 is a bottom plan view of the frame side walls 30 showing bottom end 31 and gimbal supports 33.

Figure 6:
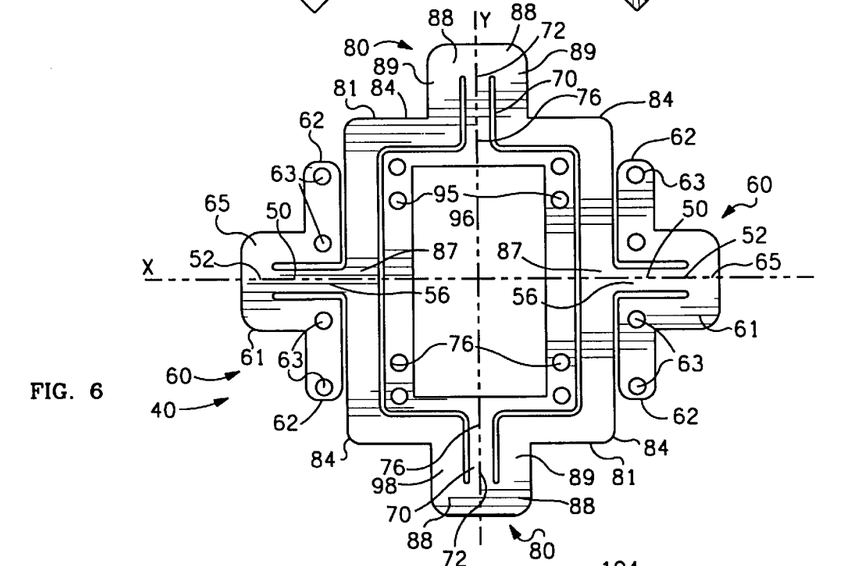
FIG. 6 is a bottom plan view of the first pair of connectors and the gimbal.

Looking also at FIG. 6 there is shown a bottom plan view of gimbal 40. Gimbal 40 may be machined out of a sheet of spring steel as shown or constructed of other suitably strong, resilient materials. Gimbal 40 supports horn 100 such that the pivot center of horn 100 may move in the Z direction and may rotate about an X axis an a Y axis but may not move in the X or Y directions.

Gimbal 40 generally includes a pair of outer torsion members 50, having in top view a longitudinal axis defining an X-axis defining the X-direction and defining a Y-direction horizontally perpendicular thereto. Each outer torsion member 50 has an outer end 52 and an inwardly disposed inner end 56, that is disposed toward horn 110 and inner end 56 of the other outer torsion member 50. In the preferred embodiment, outer torsion members 50 have a rectangular vertical cross-section having a width of approximately ten times the height. The moment of inertia of the cross section about its neutral Z-axis is very high such that, relative to outer end 52, inner end is essentially not translatable in the Y-direction. The polar moment of inertia of the cross section is such that, relative to outer end 52, inner end 56 is easily torsionally rotatable about its X-axis. The moment of inertia of the cross section about its neutral Y-axis is such that, relative to outer end 52, inner end 56 could move under force in the Z-direction, but, since outer torsion members 50 are linear and basically non-stretchable, inner ends 56 can not move in the Z-direction relative to outer ends 52 unless outer ends 52 move inward.

Gimbal 40 includes a pair of outer connection means 60, such as outer connector 61. Each outer connector 61 being associated with an outer torsion member 50 and with a gimbal support 33 and including a first end 62 connected to its associated gimbal support 33, such as with fasteners, not shown, through holes 63 and into threaded bore bores 34, and a cantilever spring section 64 supporting a second end 65 that is connected to outer end 52 of its associated outer torsion member 50. Second end 65 of outer connector supports outer end 52 of associated outer torsion member 50 in the Z-direction and such that outer end 52 cannot rotate about the X-axis and cannot move in the Y-direction.

Preferably, as shown, cantilever spring section 64 is cantilevered outward parallel to the longitudinal axis of outer torsion member 50 such that second end 65 and may move in the Z-direction and inward in response to Z-forces exerted in it by outer torsion member 50. Since Z-direction forces on horn 100 are transferred outward to outer torsion members 50, this construction provides for movement of horn 100 in the Z-direction from Z-direction forces on it.

A pair of inner torsion members 70 have in top view a longitudinal axis defining a Y-axis perpendicular to the X-axis. Each inner torsion member 70 has an outer end 72 and an inner end 76 disposed toward inner end 76 of the other inner torsion member 70. Inner torsion members 70 are constructed and function the same as outer torsion members 50 discussed above in that, relative to outer end 72, inner end 76, is torsionally rotatable about its Y-axis but is not translatable in the X-direction and cannot move in the Z-direction unless its outer end 72 moves in the Z-direction and inward. Inner end 76 of inner torsion members 70 is connected to a horn support means, such as horn support ring 95 which is fastened to horn 100, such as by fasteners, not shown, through holes 96, supporting horn 100 on gimbal 40.

An inner connection means 80, such as inner connector 81, is associated with each inner torsion member 70. Each inner connector 81 includes two arms 84. Each arm 84 has an associated outer torsion member 50 and has an outer end 87 connected to inner end 56 of its associated outer torsion members 50 and an inner end 88 connected to outer end 72 of its associated inner torsion member 70. Inner connector 80 supports outer end 72 of associated inner torsion member 70 in the Z-direction and such that outer end 72 of associated inner torsion member 70 cannot rotate about the Y-axis and cannot move in the X-direction. Preferably, as shown, cantilever spring section 89 is cantilevered outward parallel to the longitudinal axis of inner torsion member 70 such that outer end and may move in the Z-direction and inward in response to Z-forces exerted in it by inner torsion member 70. Since Z-direction forces on horn 100 are transferred outward to inner torsion members 70, this construction provides for movement of horn 100 in the Z-direction from Z-direction forces on it.

Figure 9:
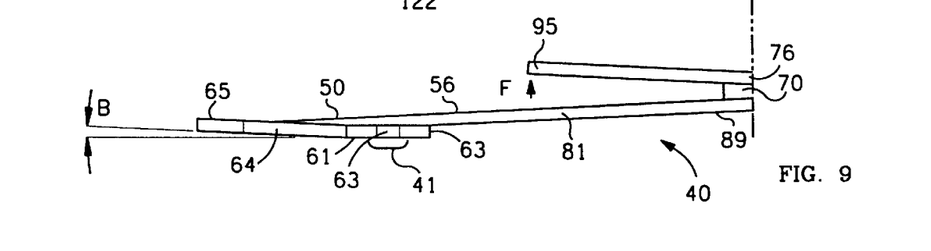
FIG. 9 is an enlarged exaggerated plan view of the left half of the gimbal spring of FIG. 8 showing relative movements of the elements.

Turning also to FIGS. 9 and 10, the above description is further clarified. FIG. 9 is an enlarged exaggerated plan view of the left half of gimbal 40 showing relative movements of the elements when force F is applied to horn support ring 95. Fastener 41 through hole 63 in first end 62 of outer connector 61 connects gimbal 40 to frame 20. Outer connector 61 includes cantilever section 64 including a second end 65 that arcs upward through angle B and inward responsive to force F transferred through the members. The upward and inward movement of second end 65 allows inner end 56 of outer torsion member 50 to move upward. Inner connector 81 includes cantilever section 89 allowing inner end 88 to rise and move inward. The inward movement of inner end 88 allows inner end 76 of inner torsion member 70 to rise.

Figure 10:
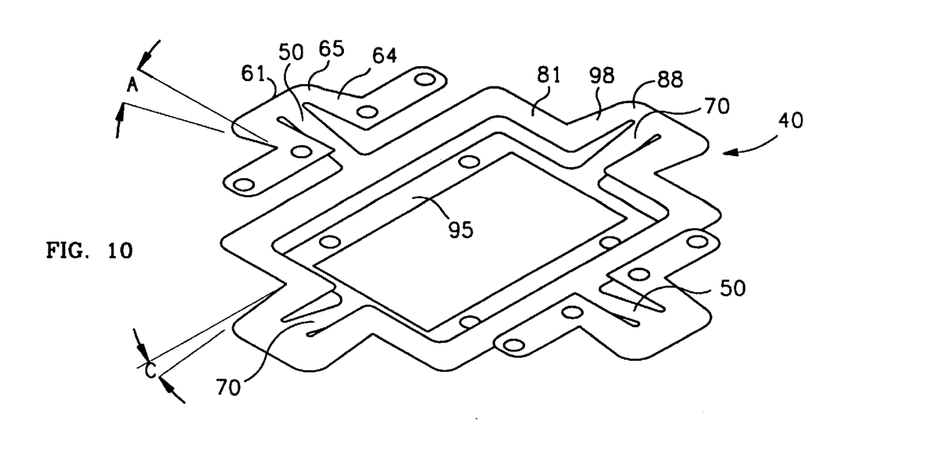
FIG. 10 is an enlarged bottom perspective view of the gimbal spring showing some of the relative movement of the elements.

FIG. 10 is an enlarged perspective bottom view of gimbal 40 showing some of the relative movement of the elements when horn 100, not shown, is moved vertically relative to frame 20. Upward movement of horn support ring 95 in the Z-direction causes the inner ends 88 of inner connectors 81 to rotate an angle C such that inner ends 88 move upward and inward and causes the second ends 65 of outer connectors 61 to rotate an angle A such that second ends 65 move upward and inward. These rotations allow the movement in the Z-direction.

Horn 100 is typically made of steel. Fasteners, such as screw fasteners, not shown, fasten horn 100 is securely to horn support ring 95 of gimbal 40 and clamp ring 98. Horn 100 has a left side 101, a right side 103, a front 105, a rear 110, a top 130 and a horn tip 120 having a bottom 121 defining a contact plane 122.

Contact plane 122 my be flat or may be of any suitable shape to perform the desired task. An inverted cone-shaped cavity 132 on top 130 accepts pivot rod 140. Horn 100 may include one or more electrical devices. In the embodiment shown, a heater element 136 surrounds pivot cavity 132 for heating horn contact plane 122. A thermocouple 138 is attached to or is placed inside horn 110 to control heater 132.

Four insulated electorial contact posts 123 project downward. As best seen in FIG. 4, the two front posts 123T are connected to thermocouple 138 by insulated wires 139 and two rear posts 123H are connected to heater 136 by wires 137.

Pivot rod 140 includes a lower end 142 including a tip 143 for bearing against the inner end 133 of cavity 132 in horn 110. Preferably, tip 143 is slightly rounded such that a circular bearing surface 144 is formed between tip 143 and cavity 132. Preferably also bearing surface 144 between tip 143 and cavity 132 is at or near the intersection of the X-axis and the Y-axis of torsion members 50,70 as this reduces the moment force required to rotate the head 110 into alignment with workpiece 230. Horn 100 may rotate about tip 143 and the X-axis and Y-axis to align with workpiece 230 as pivot rod 140 applies downward pressure to horn 100 during encounter with workpiece 230. Interference between pivot rod 140 and the wall of cavity 132 limits the maximum amount of rotation of horn 100.

Horn biasing means, such as horn biasing spring 160, lightly biases horn 100 the downward direction. Horn biasing spring 160 is a leaf spring supported at its outer ends by supports 25 and arched upward so as to impart a small downward force on pivot rod 140 which transfers the force to horn 100. Although leaf spring 160 is shown, other means are contemplated. For example, a coil spring could be used between a slightly larger stop 155 and base 22.

Pivot rod upper end 145 terminates in a transfer rod 150. Transfer rod 150 incudes an upper guide rod 153 for sliding vertical travel in bushing 24 in base 22 and a flange or stop 155. As seen in FIG. 3, in the non-pressure situation, there is a slight gap 156 between stop 155 and bushing 24. Thus, when horn 100 first encounters workpiece 230 there is only the small downward force of bias spring 160 on horn 100 such that horn 100 may easily gimbal as necessary upon encountering workpiece 230. Once the encounter with workpiece 230 has forced horn 100 upward the distance of the gap 156 such that stop 155 encounters bushing 24, then pivot rod 140 prevents further upward movement of horn 100 and full pressure is generated between horn 100 and workpiece 230.

Figure 7:
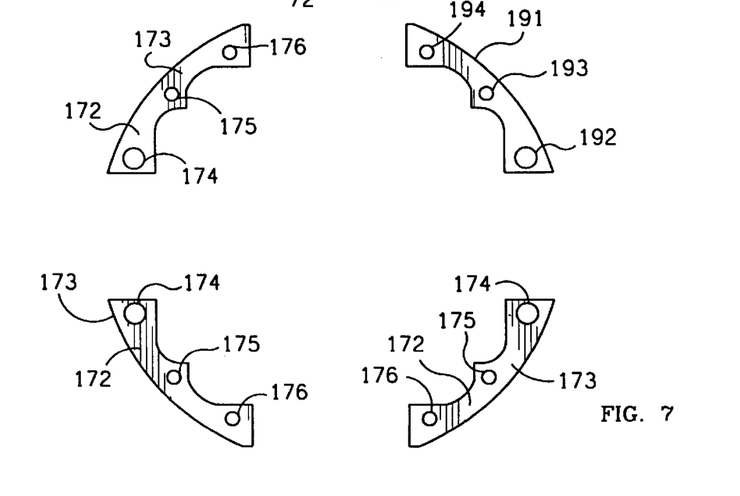
FIG. 7 is a bottom plan view of the adjustment plates and a contact plate.

With reference to FIGS. 1 and 7, there is shown adjustment means or zeroing means 170 connected to frame 20 for selectively applying a force or forces to horn 100 for rotating horn 100 about the X-axis and/or the Y-axis such that horn 100 is biased to given angular configuration prior to encountering workpiece 230. FIG. 7 is a bottom plan view of adjustment plates 173 and a contact plate 191.

In the preferred embodiment shown, zeroing means 170 includes three adjustment assemblies 172. Each adjustment assembly 172 includes an adjustment plate 173 including an arm 180, biasing means, such as spring 178 and adjustment screw 185. Bearing 174 of adjustment plate 173 is slidingly disposed on journal 36 of frame 20. Adjustment screw 185 is freely journaled in bore 175 and threadingly engaged in threaded bore 38 in frame 20. Spring 178 surrounds adjustment screw 185 between plate 173 and frame 20 and downward biases plate 173 such that movement of adjustment screw 185 moves plate 173 up and down. Adjustment arm 180 connected to each plate 173, such as by clamp 181 and fastener 182 in threaded bore 176, contacts an electrical contact post 123 of horn 100 such that as plate 173 moves horn 100 is rotated. Adjustment arm 180 of each adjustment assembly contacts a different contact post 123 on horn 100. Three adjustment arms 180 contacting horn 100 determine a plane of rotation for horn 100.

Figure 8:
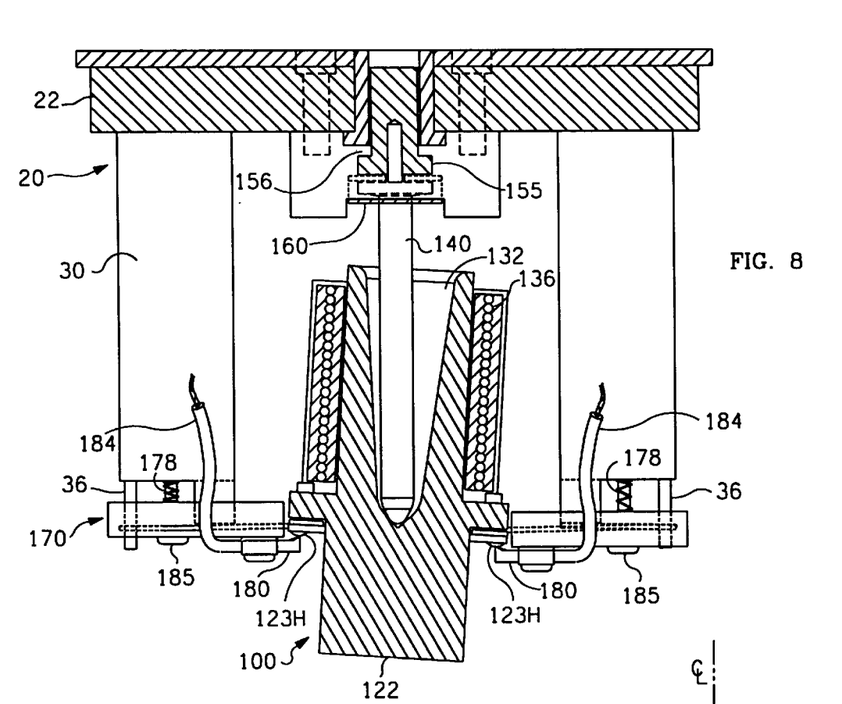
FIG. 8 is rear sectional elevation view of the head of FIG. 1 showing zero adjust/heater contacts.

FIG. 8 is rear sectional elevation view of head 10 of FIG. 1 showing zero adjust/heater contact assemblies 170 pre-adjusting the rotation of horn 100 such that contact plane 122 is angled. The third adjustment assembly determines the entire location of plane 122.

In the preferred embodiment, adjustment arms also function as electrical conductors to heater 136 and thermocouple 138. Each adjust arm 180 is electrically connected to a conductor, such as wire 184. As best seen in FIG. 4, the left front contact arm 180 makes electrical connection with one input of thermocouple 138 and the rear contact arms make electrical contact with heater leads 137. In this manner, there is no moment placed on horn 100 by the electrical couplings to heater 136 and thermocouple 138.

A contact assembly 190 functions as the fourth electrical contact to horn 100. Contact assembly 190 is similar to adjustment assembly 172 and includes a contact plate 191 including bearing 192, free bore 193 and threaded bore 194. A contact arm 195 is attached to plate 191 such as by clamp 196 and screw 197 in bore 194. Contact arm 195 is electrically connected to wire 184 for making electrical contact with thermocouple contact post 123T. As best seen in FIG. 3, weak spring 198 between the head of adjustment screw 199 lightly biases plate 191 and contact arm 195 for electrical contact with contact post 123T. Spring 198 is much weaker that biasing spring 160 such that the contact arm 195 does not rotate horn 100. In this manner all of the electorial contacts are made.

Having described the invention, it can be seen that it provides for a gimbaled head having requiring extremely low alignment forces and apparatus for zero setting the angle of the horn.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention. In the claim, the directions, such as vertical, horizontal, up and down are relative for descriptive purposes and are not absolute directions.

I claim:

1. A pressure head for relative movement in the vertical Z-axis direction for contacting a workpiece; said head comprising:

a frame;

a gimbal connected to said frame;

a horn including a contact surface for contacting the workpiece; said horn supported by said gimbal so as be rotatable about an X-axis and a Y-axis responsive to contact with the workpiece; and adjustment means connected to said frame for applying force to said horn for rotating said horn about the X-axis or the Y-axis to a desired position before contact with the workpiece.

2. The head of claim 1 wherein:

said horn includes a heater for heating said contact surface; and wherein
      said adjustment means simultaneously provides electrical communication with said heater.

3. The head of claim 1 wherein:

said adjustment means includes:
      a plurality of selectively upward and downward moveable adjustment arms; each said adjustment arms including:
         an outer end connected to said frame; and
         an inner end for applying a force on said horn for rotating said horn about the X-axis or the Y-axis to a desired position before contact with the workpiece.

4. The head of claim 3 wherein:

said horn includes an electrical device; and a said inner end of said adjustment arm simultaneously provides electrical communication with said electrical device.

5. The head of claim 1, wherein:

said adjustment means includes:
      three selectively upward and downward moveable adjustment arms; each said adjustment arm including:
         an outer end connected to said frame; and
         an inner end for applying a force on said horn for rotating said horn about the X-axis or the Y-axis to a desired position before contact with the workpiece; said adjustment arm inner ends defining a plane.

6. The head of claim 5 wherein:

said horn includes an electrical device; and said adjustment means simultaneously provides electrical communication with said electrical device.

7. A pressure head for relative movement in the vertical Z-axis direction for contacting a workpiece; said head comprising:

a frame;

a horn including a contact surface for contacting the workpiece;

a gimbal connected to said frame, said gimbal supporting said horn such that, responsive to contact with the workpiece, said horn can rotate about said X and Y rotation axes and can translate in the Z-direction relative to said frame; and adjustment means connected to said frame for applying a force on said horn for rotating said horn about the X-axis or the Y-axis to a desired position before contact with the workpiece.

8. The head of claim 7 wherein:

said horn includes an electrical device; and said adjustment means simultaneously provides electrical communication with said electrical device.

9. The head of claim 7 wherein:

said adjustment means includes:
      a plurality of selectively upward and downward moveable adjustment arms; each said adjustment arms including:
         an outer end connected to said frame; and
         an inner end for applying a force on said horn for rotating said horn about the X-axis or the Y-axis to a desired position before contact with the workpiece.

10. The head of claim 9 wherein:

said horn includes an electrical device; and a said inner end of said adjustment arm simultaneously provides electrical communication with said electrical device.

11. The head of claim 1 wherein:

said adjustment means includes:
       three selectively upward and downward moveable adjustment arms; each said adjustment arm including:
          an outer end connected to said frame; and
          an inner end for applying a force on said horn for rotating said horn about the X-axis or the Y-axis to a desired position before contact with the workpiece; said adjustment arm inner ends defining a plane.

12. The head of claim 11 wherein:

said horn includes an electrical device; and said adjustment means simultaneously provides electrical communication with said electrical device.

13. The head of claim 12 further including:

a contact arm connected to said frame and having:
       an inner end contacting said horn; said inner end moveable in the Z-direction and biased to contact said horn.

14. A head for contacting a workpiece in the vertical Z-direction; said head comprising:

a frame comprising:
       a base; and
       spaced apart gimbal supports supported by said base;

a horn having:
       a bottom for contacting the workpiece; and
       a top;

a gimbal comprising:
       a pair of outer torsion members having in top view a longitudinal axis defining an X-axis defining the X-direction and defining a Y-direction horizontally perpendicular thereto, each outer torsion member having:
          an outer end; and
          an inner end disposed toward said inner end of the other said outer torsion member; said inner end of said outer torsion member, relative to said outer end of said outer torsion member, being torsionally rotatable about its X-axis but not being translatable in the Y-direction;
       a pair of outer connectors, each outer connector associated with a said outer torsion member and with a said gimbal support and including:

a first end connected to its said associated gimbal support; and a second end connected to said outer end of its said associated said outer torsion member for supporting said outer end of said associated outer torsion member in the Z-direction and such that said outer end of said associated outer torsion member cannot rotate about the X-axis and cannot move in the Y-direction;

a pair of inner torsion members having in top view a longitudinal axis defining a Y-axis perpendicular to the X-axis; each inner torsion member having:

an outer end; and an inner end disposed toward said inner end of the other said inner torsion member; said inner end of said inner torsion member, relative to said outer end of said inner torsion member, being torsionally rotatable about its Y-axis but not being translatable in the X-direction; said inner ends of said inner torsion members connected to opposite sides of said horn for supporting said horn such that said horn may rotate about the Y-axis;

a pair of inner connectors, each inner connector associated with a said inner torsion member; each said inner connector including:

two arms; each arm having an associated outer torsion member and having:

an outer end connected to said inner end of its associated said outer torsion members; and an inner end connected to said outer end of its associated said inner torsion member; for supporting said outer end of said associated inner torsion member in the Z-direction and such that said outer end of said associated inner torsion member cannot rotate about the Y-axis and cannot move in the X-direction; said second ends of at least one pair of said connectors being moveable in the Z-direction and toward said horn responsive to force in the Z-direction on said horn such that said horn may move in the Z-direction relative to said frame;

a pivot rod including:

a lower end including:

a tip bearing against said top of said horn such that said horn may rotate about the X-axis and Y-axis and for applying downward pressure to said horn; and an upper end; and adjustment means connected to said frame for selectively applying force to said horn for rotating said horn about the X-axis or the Y-axis to a fixed position before contact with the workpiece.

15. The head of claim 14 wherein:

said horn includes an electrical device; and said adjustment means simultaneously provides electrical communication with said electrical device.

16. The head of claim 14 wherein:

said adjustment means includes:

a plurality of selectively upward and downward moveable adjustment arms; each said adjustment arms including:

an outer end connected to said frame; and an inner end for applying a force on said horn for rotating said horn about the X-axis or the Y-axis to a fixed position before contact with the workpiece.

17. The head of claim 16 wherein:

said horn includes an electrical device; and said inner end of said adjustment arm simultaneously provides electrical communication with said electrical device.

18. The head of claim 14 wherein:

said adjustment means includes:

three selectively upward and downward moveable adjustment arms; each said adjustment arm including:

an outer end connected to said frame; and an inner end for applying a force on said horn for rotating said horn about the X-axis or the Y-axis to a fixed position before contact with the workpiece; said adjustment arm inner ends defining a plane.

19. The head of claim 14 wherein:

said pair of connectors having said moveable second ends each include an outwardly cantilevered spring section parallel to the longitudinal axis of the associated torsion member and supporting its said second end.

20. The head of claim 14 further including:

biasing means connected to said frame for biasing said horn toward the workpiece.

* * * * *